United States Patent
Mupparti et al.

(10) Patent No.: US 9,348,641 B2
(45) Date of Patent: May 24, 2016

(54) SYSTEM AND METHOD FOR PERFORMING A TRANSACTION IN A MASSIVELY PARALLEL PROCESSING DATABASE

(71) Applicant: FutureWei Technologies, Inc., Plano, TX (US)

(72) Inventors: Tejeswar Mupparti, San Ramon, CA (US); Gangavara Prasad Varakur, Danville, CA (US)

(73) Assignee: Futurewei Technologies, Inc., Plano, TX (US)

( * ) Notice: Subject to any disclaimer, the term of this patent is extended or adjusted under 35 U.S.C. 154(b) by 374 days.

(21) Appl. No.: 13/798,344

(22) Filed: Mar. 13, 2013

(65) Prior Publication Data

US 2014/0279986 A1 Sep. 18, 2014

(51) Int. Cl.
*G06F 17/30* (2006.01)
*G06F 9/46* (2006.01)

(52) U.S. Cl.
CPC .......... *G06F 9/466* (2013.01); *G06F 17/30377* (2013.01); *G06F 17/30445* (2013.01); *G06F 17/30545* (2013.01)

(58) Field of Classification Search
None
See application file for complete search history.

(56) References Cited

U.S. PATENT DOCUMENTS

| | | | |
|---|---|---|---|
| 6,122,630 A | 9/2000 | Strickler et al. | |
| 6,470,342 B1 * | 10/2002 | Gondi | G06F 9/466 |
| 6,529,921 B1 * | 3/2003 | Berkowitz et al. | 715/201 |
| 8,204,860 B1 * | 6/2012 | Ferguson | G06F 17/30088 707/639 |
| 2007/0136391 A1 * | 6/2007 | Anzai | G06F 17/30197 |
| 2008/0133208 A1 | 6/2008 | Stringham | |
| 2009/0083088 A1 * | 3/2009 | Mathew et al. | 705/7 |
| 2012/0136839 A1 | 5/2012 | Eberlein et al. | |
| 2013/0080200 A1 * | 3/2013 | Connolly | G06Q 10/08 705/7.12 |

OTHER PUBLICATIONS

Sudarshan, S., "Massively Parallel/Distributed Data Storage Systems," IBM ICARE Winter School on Big Data, Oct. 7, 2012, pp. 1-167.*
International Search Report and Written Opinion for Application No. PCT/US14/24601, mailed Aug. 8, 2014, 7 pages.

* cited by examiner

*Primary Examiner* — Son T Hoang
(74) *Attorney, Agent, or Firm* — Slater Matsil, LLP (57) ABSTRACT

A method for performing a transaction in a massively parallel processing (MPP) database includes receiving, by a transaction manager, from a first resource manager, a first snapshot of the first resource manager and receiving, by the transaction manager, from a second resource manager, a second snapshot of the second resource manager. Also, the method includes reconciling the first snapshot of the first resource manager and the second snapshot of the second resource manager to generate a reconciled snapshot and transmitting, by the transaction manager, to the first resource manager and the second resource manager, the reconciled snapshot. Additionally, the method includes performing a transaction using the reconciled snapshot.

18 Claims, 9 Drawing Sheets

SYSTEM AND METHOD FOR PERFORMING A TRANSACTION IN A MASSIVELY PARALLEL PROCESSING DATABASE

TECHNICAL FIELD

The present invention relates generally to a system and method for databases, and, in particular, to a system and method for performing a transaction in a massively parallel processing database using a snapshot isolation based consistency model.

BACKGROUND

A massively parallel processing (MPP) database is a database where a large number of processors perform a set of computations in parallel. In an MPP system, a program is processed by multiple processors in a coordinated manner, with each processor working on a different part of the program and/or different data.

An MPP database system is based on shared-nothing architecture, with the tables of the databases partitioned into partitions and distributed to different processing nodes. When database queries arrive, the tasks of each query are divided and assigned to the processing nodes according to the data distribution and an optimized execution plan. The processing entities in each processing node manage only their portion of the data. However, the processing entities may communicate with one another to exchange necessary information during execution. A query may be divided into multiple sub-queries, and the sub-queries may be executed in parallel or in some optimal order in some or all processing nodes. The results of the sub-queries may be aggregated and further processed. Subsequently, more sub-queries may be executed based on the result.

SUMMARY

An embodiment method of performing a transaction in a massively parallel processing (MPP) database includes receiving, by a transaction manager, from a first resource manager, a first snapshot of the first resource manager and receiving, by the transaction manager, from a second resource manager, a second snapshot of the second resource manager. Also, the method includes reconciling the first snapshot of the first resource manager and the second snapshot of the second resource manager to generate a reconciled snapshot and transmitting, by the transaction manager, to the first resource manager and the second resource manager, the reconciled snapshot. Additionally, the method includes performing a transaction using the reconciled snapshot.

Another embodiment method of performing a first transaction in an MPP database includes transmitting, by a first resource manager, to a transaction manager, a first snapshot of the first resource manager and receiving, by the resource manager, from the transaction manager, a reconciled snapshot in accordance with the first snapshot of the first resource manager and a second snapshot of a second resource manager. Also, the method includes performing a first transaction using the reconciled snapshot.

An embodiment first node of an MPP database includes a processor and a computer readable storage medium storing programming for execution by the processor. The programming including instructions to receive, by the transaction manager, from a first resource manager, a first snapshot of the first resource manager and receive, by the transaction manager, from a second resource manager, a second snapshot of the second resource manager. Also, the programming includes instructions to reconcile the first snapshot of the first resource manager and the second snapshot of the second resource manager and transmit, by the transaction manager, to the first resource manager and the second resource manager, the reconciled snapshot. Additionally, the programming includes instructions to perform a transaction using the reconciled snapshot.

Another embodiment first node of an MPP database includes a processor and a computer readable storage medium storing programming for execution by the processor. The programming including instructions to transmit, by the first resource manager, to a transaction manager, a first snapshot of the first resource manager and receive, by the first resource manager, a reconciled snapshot and a second snapshot of a second resource manager. Also, the programming includes instructions to perform a transaction using the reconciled snapshot.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Transactions form the foundation for atomicity, concurrency, isolation and durability (ACID) properties of database systems. A transaction is a transaction with read-committed isolation semantics. ACID properties ensure that database transactions are reliably processed. Atomicity requires that if one part of a transaction fails, the entire transaction fails, and the database remains unchanged. Consistency ensures that a transaction transitions the database from one valid state to another valid state. Isolation ensures that the result of concurrent execution of transactions is the same as if the transactions were performed in a serial order. Also, durability requires that once a transaction has been committed, all changes made by the transaction remain durable and permanent, and the transaction remains committed even if the transient states of the processor nodes are lost, for example as a result of power outage or crash.

To maintain ACID properties, the intermediate states between the steps of a transaction should not be visible to other concurrent transactions. For atomicity, if a failure occurs that prevents the transaction from completing, then none of the steps affect the database, ensuring that consistent data is seen by everyone. In a single node non-distributed database system there is one database management instance with the transaction manager that ensures the ACID properties by implementing strict two phase locking (SS2PL) or snapshots. A transaction is a logical grouping of a set of actions such as selecting the data, updating the data, inserting the data, and deleting the data. A transaction system that spans multiple nodes needs to have the global knowledge of the current active transactions of all the systems in the entire system. Knowledge of the current active transactions may be known as a transaction-snapshot or a snapshot.

Metadata information of the data and the system is used to create a snapshot. Each row is appended with the transaction ID that modifies it. A snapshot is a list of current active transactions on the system. By using the snapshot, the transaction manager determines the visibility of data before executing any action. If the transaction ID pertains to any of the transactions in the snapshot list, data should not be visible, since the transaction is still active, and the intermediate states of the action should not be seen by other transactions.

Figure 1:
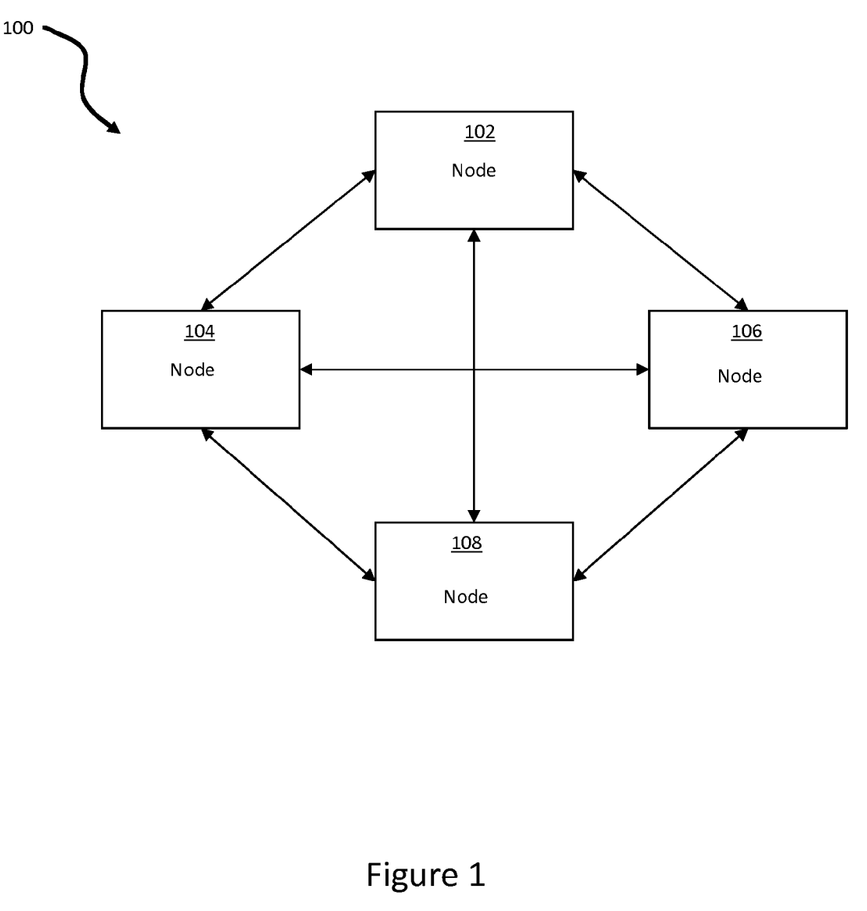
FIG. 1 illustrates an embodiment massively parallel processing (MPP) database system.

FIG. 1 illustrates an example of a massively parallel processing (MPP) database system 100. System 100 illustrates four nodes: first node 102, second node 104, third node 106, and fourth node 108. Each node may communicate with each other node. Four nodes are illustrated for clarity. However, in practice more nodes, including many more nodes, may be used.

A distributed transaction is a transaction that performs an operation on two or more networked computer systems. In an example, a user may start a transaction on first node 102, and access data locally. If the transaction needs to access data on a remote node, such as on second node 104, a distributed transaction capability may be used to handle the transaction globally. In one example, a centralized component maintains the state of all transactions in the system. Every transaction in the system gets a snapshot either at the beginning of the transaction or for each statement within the transaction. Any transaction in the system transmits a request for a snapshot to the centralized component, which provides snapshots to the individual nodes of the system.

Although data may be scattered across the system, the distribution is transparent to the user. For transaction originated at one node, if non-local data is needed, the node transparently opens branches of the same transaction on remote nodes. Additionally, atomicity and durability may be satisfied by using an implicit two phase commit (2PC) protocol, ensuring that, although data is modified and accessed across multiple nodes, all units of work are logically tied to one unit. In 2PC, a global transaction ID is assigned by the transaction manager (TM) to each resource manager (RM). In an example, the node where the parent transaction originated becomes the TM, and the branch transaction nodes become the RMs. Any node may be a transaction manager or a resource manager, depending on the particular transaction. The TM coordinates the decision to commit or rollback with each RM. Also, a local transaction ID is assigned by each RM. The TM adds the node name as a suffix to the parent transaction ID to obtain the global transaction ID for all branches of the transaction, ensuring that the global transaction ID is unique. For example, if a transaction is started on first node 102, first node 102 becomes the TM. Data accessed non-locally, residing on a remote node, may be executing under a new remote transaction. These new remote transactions are branches of the same parent transaction. When the client uses an explicit commit, the TM coordinates a 2PC protocol to commit or rollback all the branches of the parent transaction.

To ensure isolation consistency for the transaction, in an embodiment, a parent transaction collects the snapshot information from all the remote nodes that are involved in the transactions. All of these snapshots are reconciled to eliminate any inconsistencies, and a new snapshot is constructed. This newly constructed snapshot is transmitted back to the participant nodes of this transaction, which is used by all the nodes to execute the statements of the transactions. In one embodiment, all the systems involved in the transaction see the same consistent view of the data, and the embodiment gives a read committed isolation level.

Figure 2:
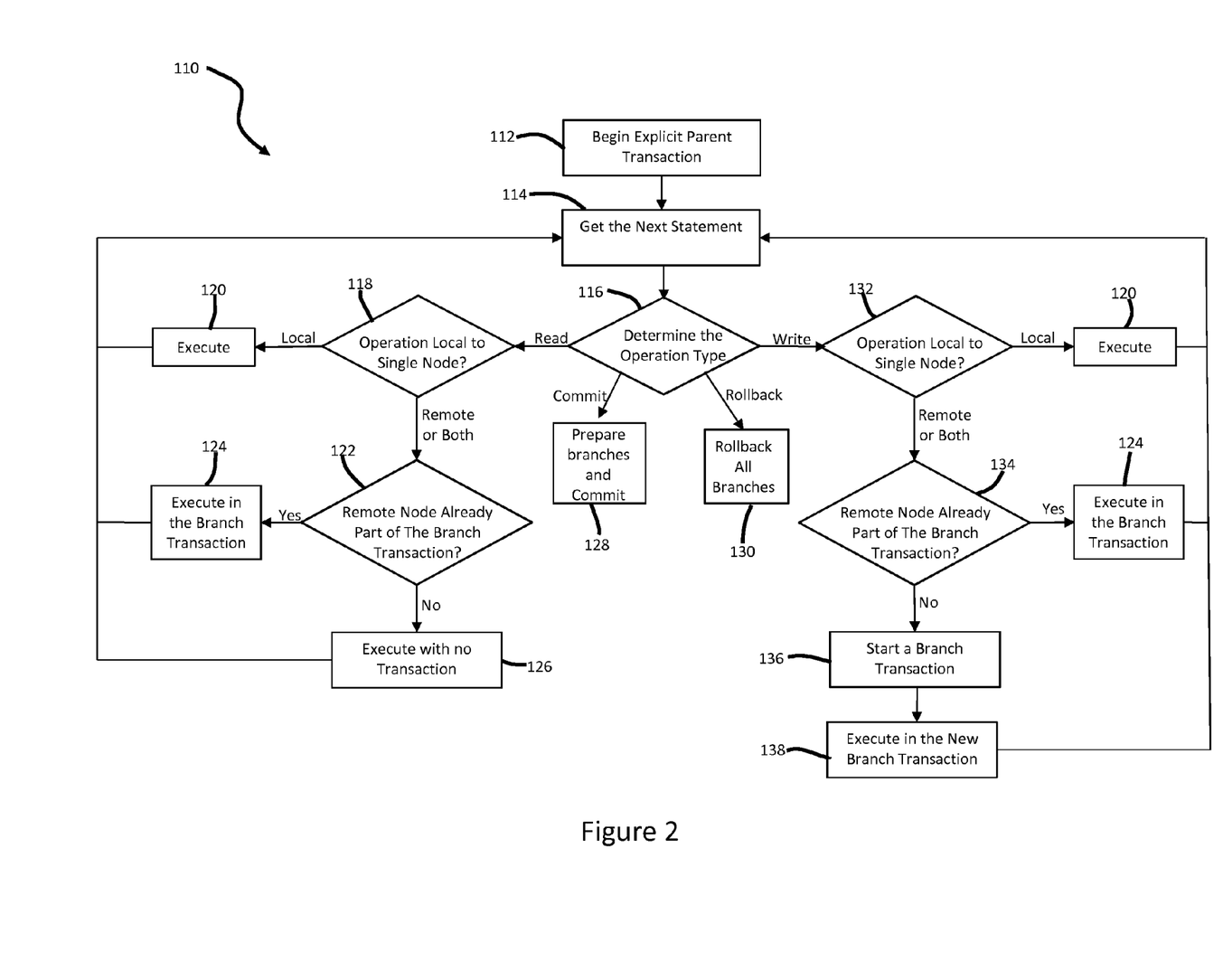
FIG. 2 illustrates an embodiment method of performing a transaction in an MPP database system.

FIG. 2 illustrates flowchart 110, which depicts an embodiment method of executing a transaction in an MPP system. Initially, in step 112, an explicit parent transaction begins. Then, in step 114, the next statement is acquired and, in step 116, the operation type is determined. If the operation type is a commit operation, all branches are prepared, the transaction is ended, and the changes become visible in step 128. However, if the operation type is a rollback, a rollback is performed on all branches, and the MPP system is returned to a previous state in step 130.

On the other hand, if the operation type is determined to be a read, whether the operation is local to a single node is determined in step 118. If the operation is local to a single node, the read operation is executed in step 120, and the system returns to step 114. If the read operation is remote or occurs both remotely and locally, in step 122 it is determined if the remote node is already a part of the branch transaction. If the remote node is already part of the branch transaction, the branch transaction is executed in step 124, and the system returns to step 114. However, if the remote node is not already part of the branch transaction, the read command is executed with no transaction in step 126, and the system returns to step 114.

Similarly, if the operation type is determined to be a write operation, in step 132, it is determined if the operation is local to a single node. If the operation is local to a single node, the write command is executed in step 120, and the system returns to step 114. However, if the operation is remote or both local and remote, the system goes to step 134, where it determines if the remote node is already part of the branch transaction. If the remote node is already part of the branch transaction, the branch transaction is executed in step 124, and the system returns to step 114. However, if the remote node is not part of the branch transaction, a new branch transaction is started in step 136. Then, the new branch transaction is executed in step 138, and the system returns to step 114. The system obtains the next statement in step 114. The system continues to get new statements until a commit or rollback is performed.

Figure 3:
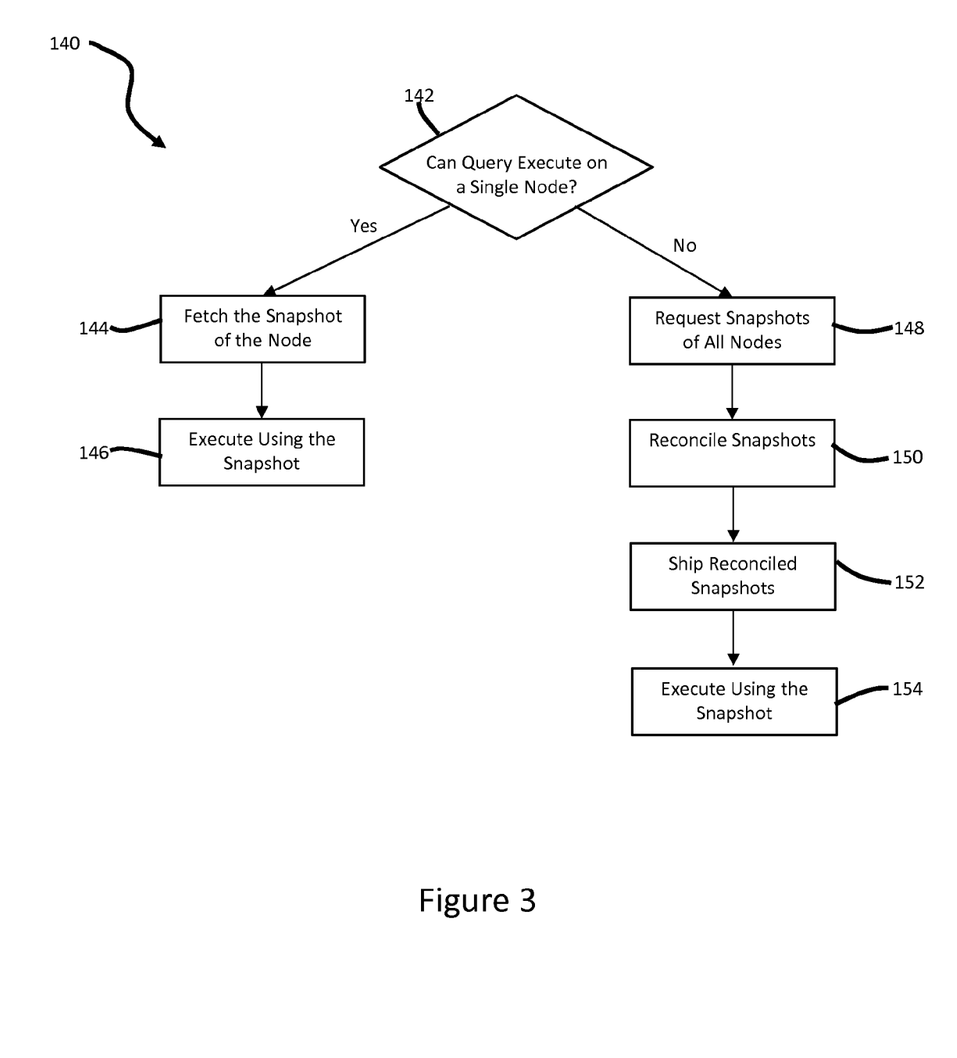
FIG. 3 illustrates an embodiment method of reconciling a snapshot in an MPP database system.

FIG. 3 illustrates flowchart 140 for an embodiment method of reconciling snapshots. Initially, in step 142, the TM determines if the query can be executed on a single node. If the query can be executed on a single node, in step 144, the TM retrieves the snapshot of the node, and in step 146 executes the query using the retrieved snapshot. However, if the query cannot be executed on a single node, the TM requests snapshots from all nodes required for the transaction in step 148. Then, in step 150, the TM reconciles the snapshots, and in step 152, the TM transmits the reconciled snapshots to the other nodes. Finally, in step 154, the query is executed using the reconciled snapshot.

Figure 4:
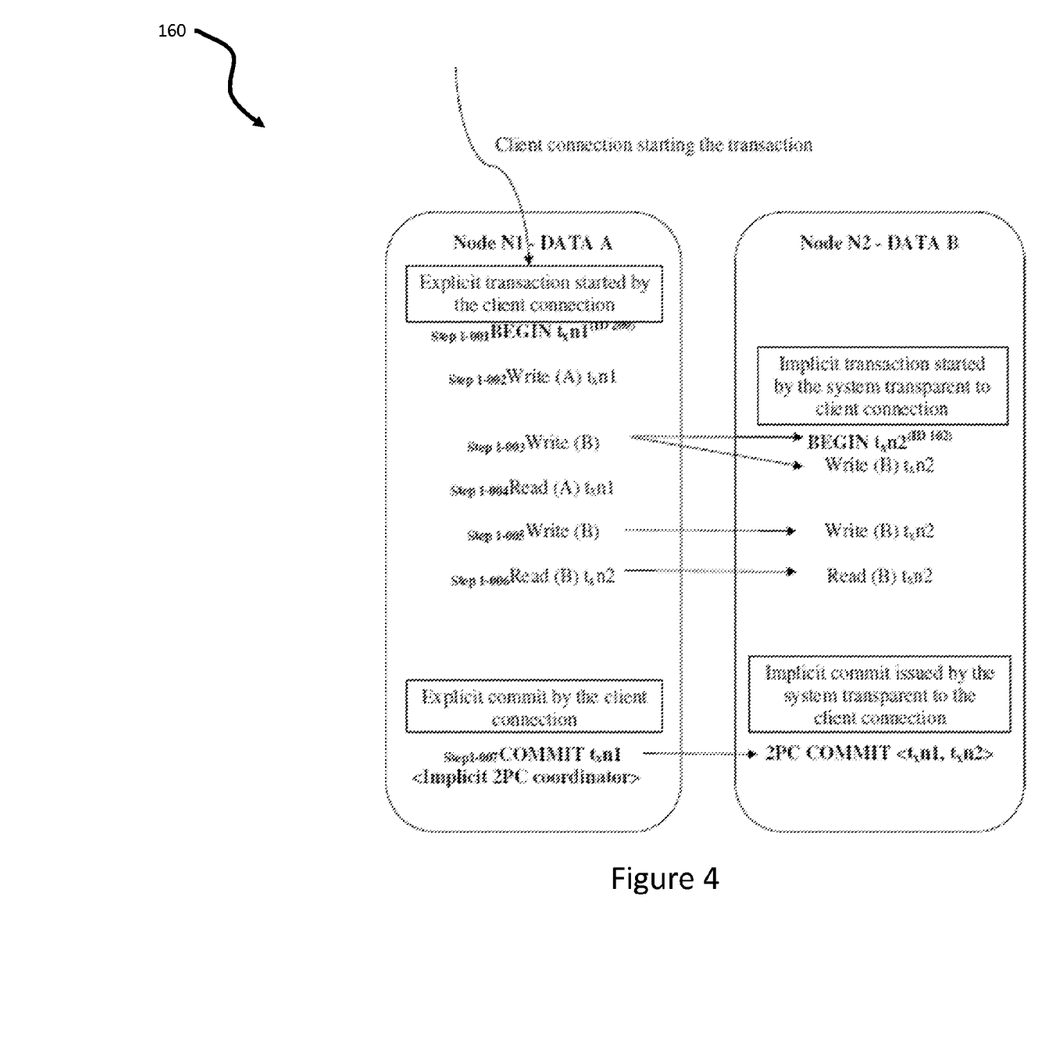
FIG. 4 illustrates an embodiment two phase protocol.

FIG. 4 illustrates an implicit two phase protocol 160 that is transparent to users. Initially, first node 102 has non-shared data A and second node 104 has non-shared data B. A client connection lands on first node 102, and starts explicit transaction $t_xn1$ having a transaction ID of 200. Next, a begin command initiates the transaction. $T_xn1$ is the parent transaction, and first node 102 is the TM. In this example, the parent transaction involves modifying and accessing data A and data B. Then a Write(A) command is performed, which writes data locally. Write(A) is carried out in the context of $t_xn1$ on first node 102. After Write(A), Write(B), a write operation on data B in second node 104 is performed. An implicit transaction $t_xn2$, having a transaction ID 102 is performed on second node 104. The transaction $t_xn2$ is a branch of $t_xn1$. Next, Read(A) is performed, which is a read operation on local data A. Read(A) is carried on in the local transaction's context $t_xn1$ on first node 102. Then, a Write(B) operation is performed on data B, and a Read(B) operation is performed on data B, both on second node 104. These commands are performed in the transaction $t_xn2$, which is already open. Finally, a commit command is issued explicitly by the client. First node 102 recognizes itself as the TM and the commit operation is automatically transformed into a two phase commit (2PC) algorithm. First node 102 generates a global ID by appending the node's logical name to the transaction ID. The global ID is generated when the transaction spans multiple nodes. When a branch transaction is opened, the global ID is transmitted to other nodes along with the request to create a branch transaction. For example, the global ID will be Tnode-n1-200 by adding the node name n1 to the transaction ID 200. The global ID is guaranteed to be unique across the system. Then, the transactions $t_xn1$ and $t_xn2$ are prepared in the first phase of 2PC using the global ID Tnode-n1-200. Finally, responses are combined, and the second phase of committing is issued by first node 102.

Figure 5:
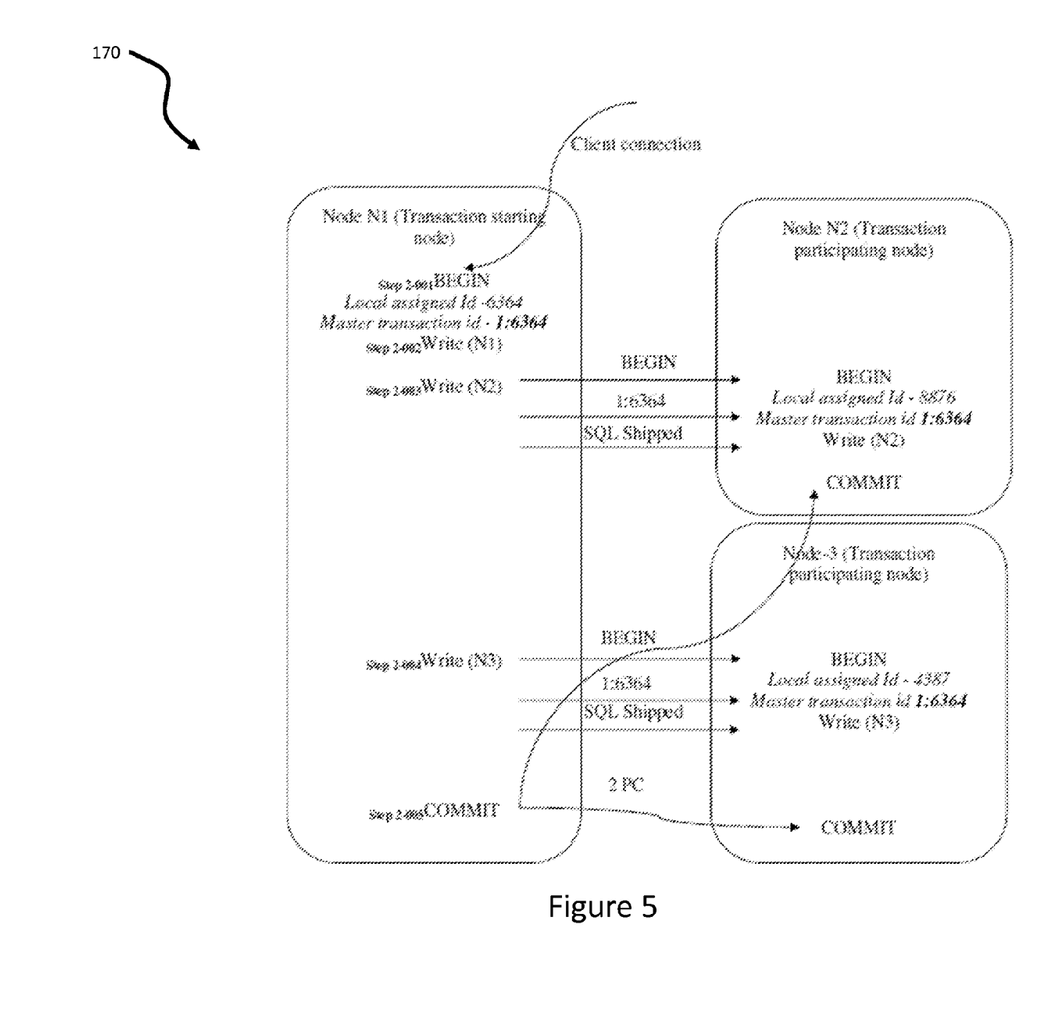
FIG. 5 illustrates an embodiment generation of a global transaction ID.

FIG. 5 illustrates the generation of a global transaction ID 170 where the global transaction ID is maintained across all branches of the transaction involved on remote nodes. In an example, every transaction is identified by a unique transaction ID. In another example, every transaction is identified as a transaction pair having a global transaction ID and a local transaction ID. The local transaction ID is a locally generated ID. Then, the global transaction ID is generated by appending the node number to the local transaction ID.

In FIG. 5, a transaction is explicitly started on first node 102 by a client connection. First node 102 is the TM, and is assigned a local transaction ID of 6364. The automatically generated global transaction ID is 1:6364, which is created by appending node number "1" to the local transaction ID 6364. Then, the Write(N1) command is performed, which is a local write operation performed on first node 102 executed in the context of <1:6364, 6364>. After that, in Write (N2), a remote operation is performed on second node 104. An implicit transaction is opened on second node 104. Also, the local transaction manager of second node 104 is assigned a local transaction ID of 8876. Also, the new transaction is a branch of the parent transaction, and it obtains a global transaction ID from the parent transaction. In this example, the global transaction ID is 1:6364. Hence, the remote operation is executed in the context of <1:6364, 8876>.

Next, the operation Write(N3) is performed on third node 106. A new branch transaction is opened on third node 106, which has the same global transaction ID, 1.6364, as the parent transaction. This global transaction ID is transmitted and forms a pair with the local transaction ID 4387. The operation Write(N3) is then executed in the context of <1:6364, 4387>. Finally, a commit operation deploys an implicit 2PC protocol to commit on all three nodes. The parent transaction 6364 is committed on first node 102, branch 8876 is committed on second node 104, and branch 4387 is committed on third node 106. Although the parent and its branches execute on each individual node as individual transactions, by assigning all transactions a pair of IDs, where the global transaction ID is common to all the transaction pairs, the transactions are identified as part of the same global transaction.

Figure 6:
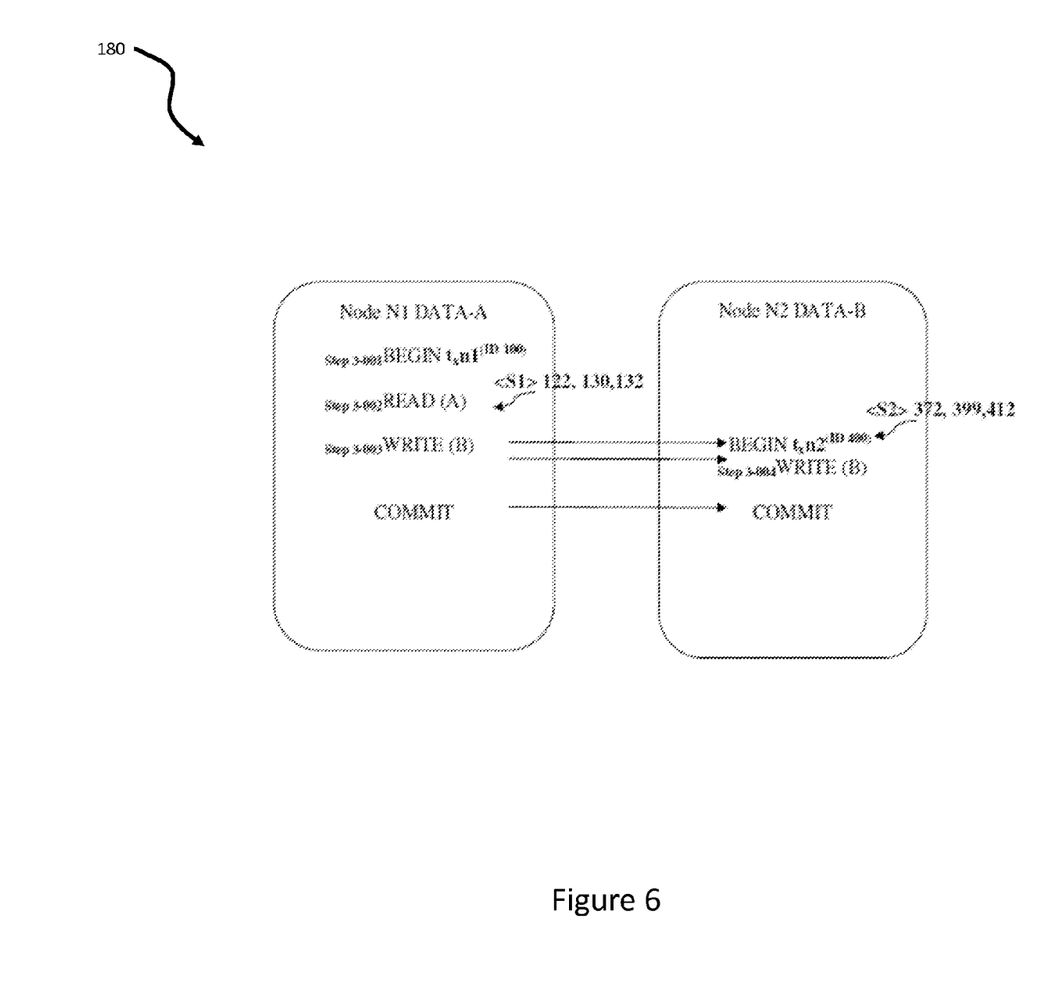
FIG. 6 illustrates a query executed in a single node.

In a distributed environment, a single statement of a transaction may be executed on one node, for example "select col1 from table where col1='data-on-local-node.'" Alternatively, a single statement may be executed on more than one node, for example "select col1 from table where TRUE." FIG. 6 illustrates a simple transaction scenario 180 where each query in the transaction can be completely executed locally on a single node. For example, any of the select, update, insert, and delete operations involve only one node, not multiple nodes. A snapshot is a list of active transactions at any time. The snapshot information is used by the transaction manager to ensure proper isolation levels. Thus the snapshot helps the current transaction not to see the intermediate states of the current active transactions. In an example, every node maintains their snapshot using a local transaction ID with additional metadata to identify the corresponding global transaction ID for each local transaction ID.

In FIG. 6, a transaction $t_xn1$ having a local transaction ID of 100 is started on first node 102. Then, Read(A) is performed, which requires a local snapshot. The local snapshot, which provides the list of active transactions at this time on first node 102, is used to determine the visibility of the data. The snapshot for first node 102 is <S1> 122, 130, 132, where the transactions with local transaction IDs 122, 130, and 132 are currently running on first node 102. Any data modified by these transactions should not be seen by $t_xn1$, to ensure read committed isolation. Then, a Write(B) command initiates a remote transaction $t_xn2$ with a local transaction ID of 200 on second node 104. The statement is transmitted to second node 104. Then, a local snapshot is requested on second node 104. This local snapshot is <S2> 372, 399, 412. The transactions with local transaction IDs 372, 399, and 412 are currently running on second node 104, and any data modified by these transactions should not be seen by the $t_xn2$, enabling the read commit isolation for this statement on second node 104.

Figure 7:
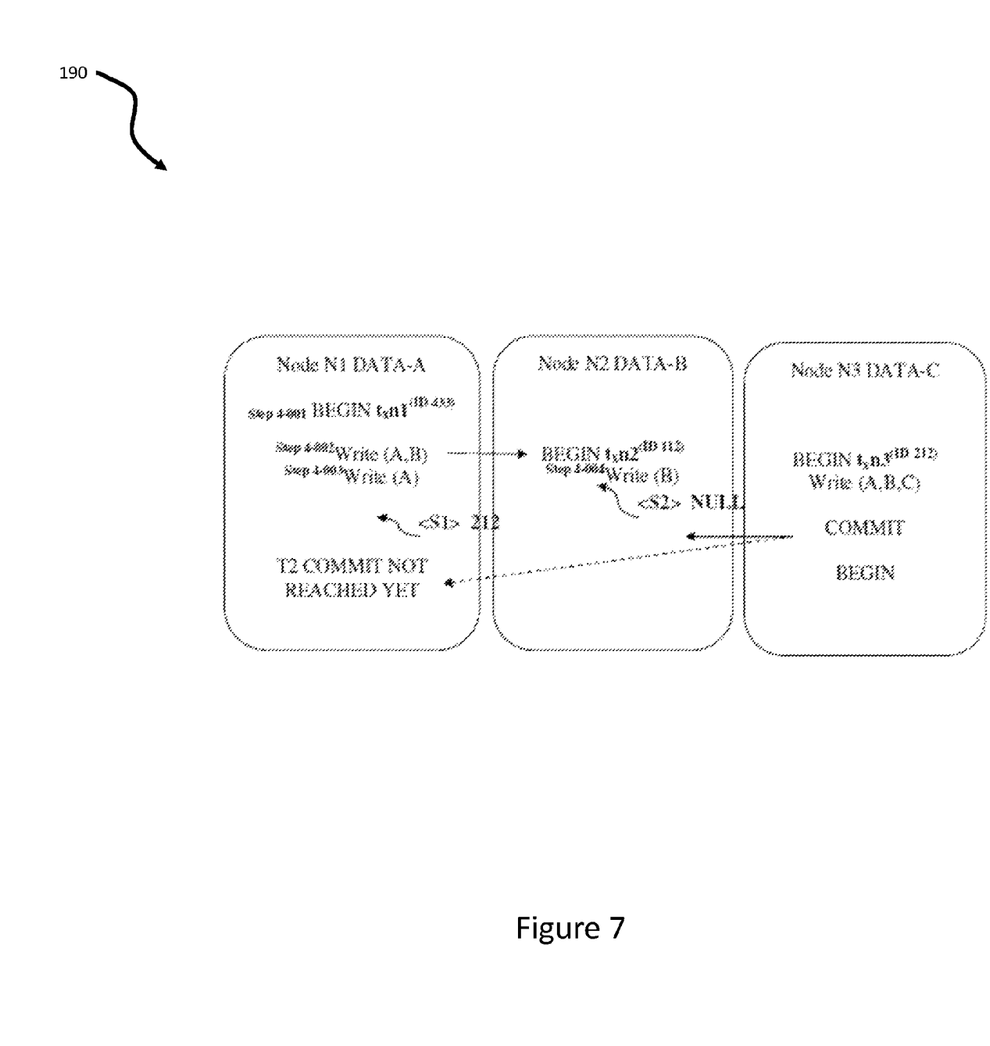
FIG. 7 illustrates an inconsistent transaction state.

FIG. 7 illustrates a transaction $t_xn1$ 190 involving a query that is executed on both first node 102 and second node 104. Initially, the transaction $t_xn1$, having a transaction ID of 433, is started on first node 102. Then, command Write(A,B) involves the modification of data on both first node 102 and second node 104. Hence, a new transaction $t_xn2$ having a transaction ID of 112 is opened on second node 104. Simultaneously, there is another transaction $t_xn3$ having a transaction ID 212 executing on first node 102 and second node 104 in the final commit phase. The transaction $t_xn3$ is prepared and committed on second node 104, but has not yet committed on first node 102. At this time, on first node 102, a snapshot is requested and <S1> 212 is given, because 212 is still active. However, on second node 104, the snapshot given is <S2> NULL, because 212 has already been completed on second node 104. If the query of Write (A,B) is performed using local snapshots, there will be an inconsistent state, transaction where ID 212 appears as committed on second node 104 but not on first node 102.

Figure 8:
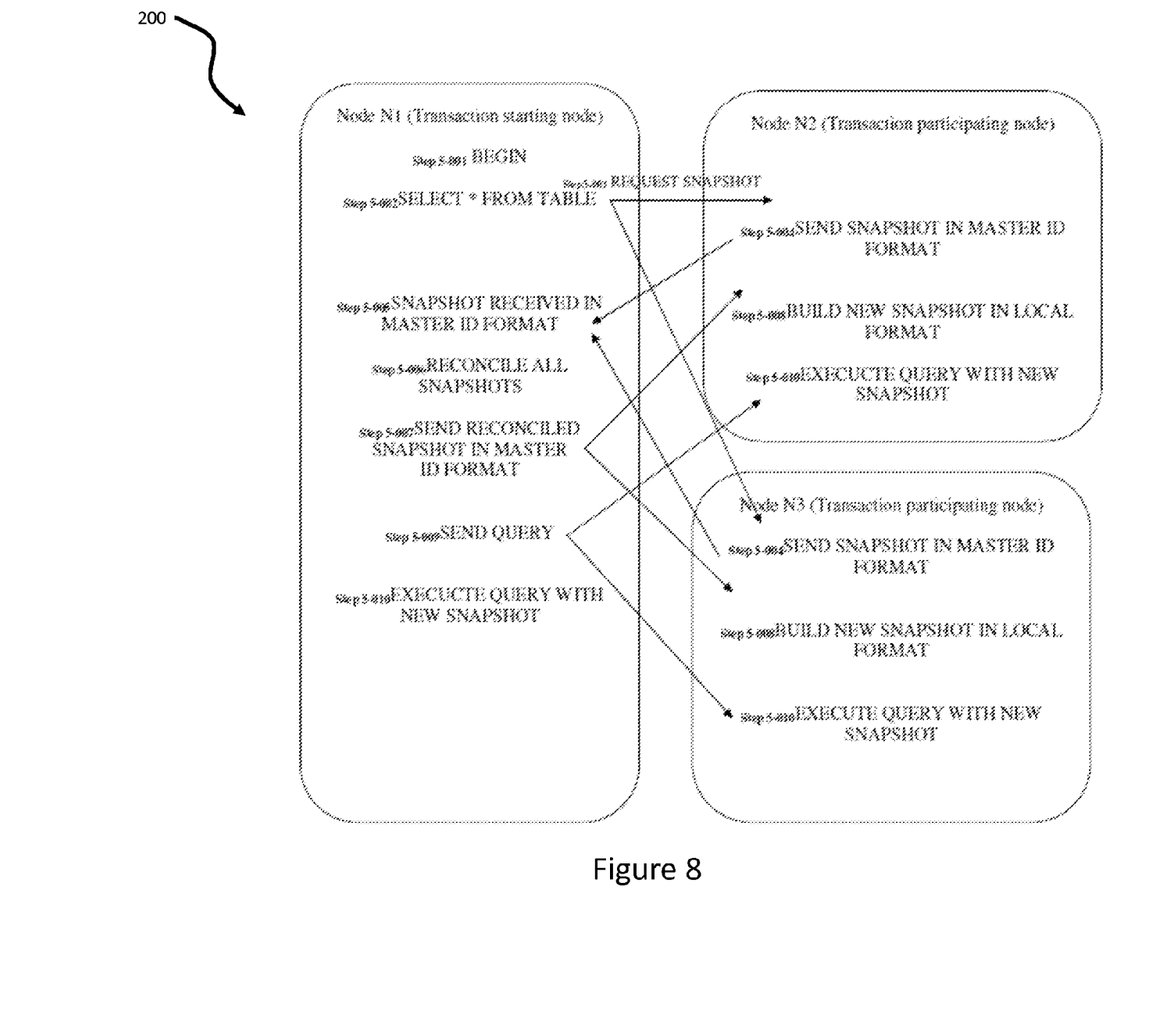
FIG. 8 illustrates a statement executed on multiple nodes with snapshot reconciliation.

To eliminate such inconsistencies, an embodiment implements snapshot reconciliation 200, as illustrated in FIG. 8. Initially, a transaction is started, and a query is executed on first node 102, second node 104, and third node 106. First node 102, the TM where the transaction started, transmits a short snapshot request message to second node 104 and third node 106, all the participating nodes where the statement will be executed before starting execution of the query. Then, second node 104 and third node 106 take the latest snapshot and transmit the snapshot in a global ID only format. In the global ID only format, for all the active transactions, only the global transaction IDs are transmitted. First node 102 receives all the snapshots from the participating nodes, second node 104 and third node 106. Then first node 102 forms a reconciled list of all the snapshots of first node 102, second node 104, and third node 106, which is a new list of IDs that is the union sets of the lists from all the nodes. Next, first node 102 transmits the reconciled snapshots to all the participating nodes.

All the participating nodes receive the reconciled snapshot list in global ID format, and convert it to local format. Every global transaction ID in the list corresponds to a local transaction ID. The conversion of the reconciled snapshot from the global to local format involves the step of adjustment to eliminate inconsistencies. Participating nodes take an intersection of the reconciled snapshot with the snapshot sent to the TM. For any transaction that was not part of the intersection, either the current node never participated in the transaction, or the node participated in the transaction, but sees it as active on other nodes. If the current node never participated in the transaction, this transaction ID can be ignored. However, if the node participated in the transaction, the new transaction ID will be included as a part of the newly constructed snapshot, ensuring that if one node is not seeing the effects of a transaction, then none of the nodes see it. After that, the TM transmits the query text to all the participating nodes. Finally, all the participating nodes execute the query using the newly constructed snapshot.

Figure 9:
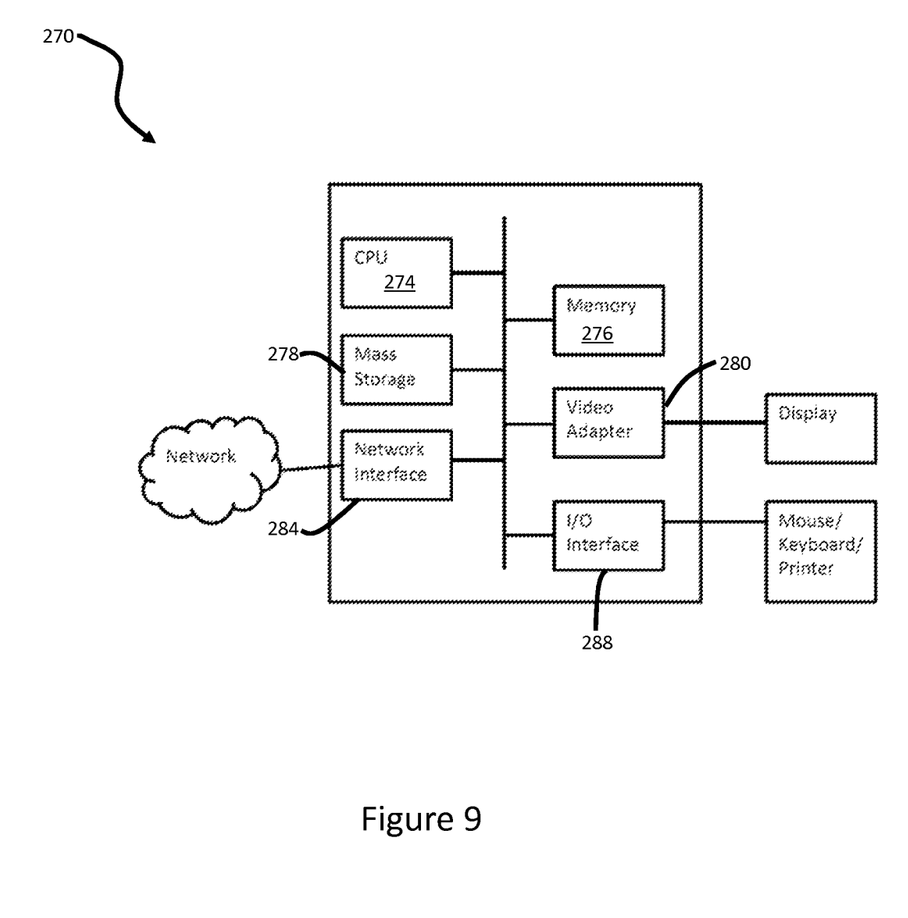
FIG. 9 illustrates a block diagram illustrating computing platform that may be used for implementing, for example, the devices and methods described herein, in accordance with an embodiment.

FIG. 9 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Advantages of an embodiment include an ability to manage snapshots without a single point of failure (SPOF). Also, advantages of embodiments include improved scalability.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for transaction processing in a massively parallel processing (MPP) database, the method comprising:
receiving, by a transaction manager, from a first resource manager, a first snapshot of the first resource manager, wherein the first snapshot is a list of current active transactions on the first resource manager;
receiving, by the transaction manager, from a second resource manager different from the first resource manager, a second snapshot of the second resource manager, wherein the second snapshot is a list of current active transactions on the second resource manager;
reconciling the first snapshot of the first resource manager and the second snapshot of the second resource manager to generate a reconciled snapshot, wherein
the reconciled snapshot comprises a union set of the first snapshot and the second snapshot,
the first snapshot comprises a local transaction identifier (ID) for a first current active transaction on the first resource manager and the reconciled snapshot comprises a global transaction ID for the first current active transaction, and
the global transaction ID is assigned by the transaction manager to the first current active transaction indicating the first current active transaction being performed remotely from the first resource manager;
transmitting, by the transaction manager, the reconciled snapshot to the first resource manager and the second resource manager; and
performing the first current active transaction using the reconciled snapshot.

2. The method of claim 1, wherein the global transaction ID being assigned by appending a logical name of the transaction manager to the local transaction ID.

3. The method of claim 1, further comprising assigning the local transaction ID to the first resource manager.

4. The method of claim 1, further comprising receiving, by the transaction manager, from a third resource manager, a third snapshot of the third resource manager, wherein the reconciling the first snapshot of the first resource manager and the second snapshot of the second resource manager further comprises reconciling the third snapshot of the third resource manager with the first snapshot of the first resource manager and the second snapshot of the second resource manager.

5. The method of claim 1, further comprising receiving, by the transaction manager, from a plurality of resource managers, a plurality of snapshots of the plurality of resource managers, wherein the reconciling the first snapshot of the first resource manager and the second snapshot of the second resource manager further comprises reconciling the plurality of snapshots of the plurality of resource managers with the first snapshot of the first resource manager and the second snapshot of the second resource manager.

6. The method of claim 1, further comprising determining whether the first current active transaction is local to the transaction manager.

7. The method of claim 1, further comprising performing a commit of the first current active transaction.

8. The method of claim 1, further comprising performing a rollback of the first current active transaction.

9. The method of claim 1, further comprising transmitting, by the transaction manager, a request for the first snapshot of the first resource manager.

10. A method for transaction processing in a massively parallel processing (MPPI database, the method comprising:
transmitting, by a first resource manager, to a transaction manager, a first snapshot of the first resource manager, wherein the first snapshot is a list of current active transactions on the first resource manager;
receiving, by the first resource manager, from the transaction manager, a reconciled snapshot by reconciling the first snapshot of the first resource manager and a second snapshot of a second resource manager different from the first resource manager, wherein
the second snapshot is a list of current active transactions on the second resource manager
the reconciled snapshot comprises a union set of the first snapshot and the second snapshot,
the first snapshot comprises a local transaction identifier (ID) for a first current active transaction on the first resource manager and the reconciled snapshot comprises a global transaction ID for the first current active transaction; and
the global transaction ID is assigned by the transaction manager to the first current active transaction indicating the first current active transaction being performed remotely from the first resource manager;
performing, by the first resource manager, the first current active transaction using the reconciled snapshot.

11. The method of claim 10, further comprising performing a commit of the first current active transaction.

12. The method of claim 10, further comprising performing a rollback of the first current active transaction.

13. The method of claim 10, further comprising receiving, by the first resource manager, from the transaction manager, a request for the first snapshot.

14. The method of claim 10, further comprising converting the reconciled snapshot to a converted snapshot.

15. The method of claim 14, wherein the converting the reconciled snapshot to the converted snapshot comprises reducing inconsistencies in the reconciled snapshot.

16. The method of claim 15, wherein the reducing inconsistencies in the reconciled snapshot comprises:
determining an intersection of the reconciled snapshot and the first snapshot; and determining whether a second transaction that was not a member of the intersection is included in the converted snapshot in accordance with whether the first resource manager participated in the second transaction.

17. A transaction manager of a massively parallel processing (MPP) database comprising:
a hardware processor; and
a computer readable storage medium storing programming for execution by the processor, the programming including instructions to
receiving, by a transaction manager, from a first resource manager, a first snapshot of the first resource manager, wherein the first snapshot is a list of current active transactions on the first resource manager;
receiving, by the transaction manager, from a second resource manager different from the first resource manager, a second snapshot of the second resource manager, wherein the second snapshot is a list of current active transactions on the second resource manager;
reconciling the first snapshot of the first resource manager and the second snapshot of the second resource manager to generate a reconciled snapshot, wherein
the reconciled snapshot comprises a union set of the first snapshot and the second snapshot, the first snapshot comprises a local transaction identifier (ID) for a first current active transaction on the first resource manager and the reconciled snapshot comprises a global transaction ID for the first current active transaction, and the global transaction ID is assigned by the transaction manager to the first current active transaction indicating the first current active transaction being performed remotely from the first resource manager;

transmitting, by the transaction manager, the reconciled snapshot to the first resource manager and the second resource manager; and performing the first current active transaction using the reconciled snapshot.

18. A first resource manager of a massively parallel processing (MPP) database comprising:

a hardware processor; and a computer readable storage medium storing programming for execution by the processor, the programming including instructions to transmitting, by a first resource manager, to a transaction manager, a first snapshot of the first resource manager, wherein the first snapshot is a list of current active transactions on the first resource manager;

receiving, by the first resource manager, from the transaction manager, a reconciled snapshot by reconciling the first snapshot of the first resource manager and a second snapshot of a second resource manager different from the first resource manager, wherein the second snapshot is a list of current active transactions on the second resource manager the reconciled snapshot comprises a union set of the first snapshot and the second snapshot, the first snapshot comprises a local transaction identifier (ID) for a first current active transaction on the first resource manager and the reconciled snapshot comprises a global transaction ID for the first current active transaction; and the global transaction ID is assigned by the transaction manager to the first current active transaction indicating the first current active transaction being performed remotely from the first resource manager;

performing, by the first resource manager, the first current active transaction using the reconciled snapshot.

\* \* \* \* \*